US012663066B2

(12) United States Patent
Mattes

(10) Patent No.: US 12,663,066 B2
(45) Date of Patent: Jun. 23, 2026

(54) CASING FOR A DRIVE UNIT, COMPRISING AN EXHAUST VENTILATION INTERFACE, AND DRIVE UNIT

(71) Applicant: Schaeffler Technologies AG & Co. KG, Herzogenaurach (DE)

(72) Inventor: Philipp Mattes, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 65 days.

(21) Appl. No.: 18/714,398

(22) PCT Filed: Oct. 26, 2022

(86) PCT No.: PCT/DE2022/100795
§ 371 (c)(1),
(2) Date: May 29, 2024

(87) PCT Pub. No.: WO2023/093931
PCT Pub. Date: Jun. 1, 2023

(65) Prior Publication Data
US 2026/0016078 A1 Jan. 15, 2026

(30) Foreign Application Priority Data
Nov. 29, 2021 (DE) .......................... 102021131216.7

(51) Int. Cl.
*F16H 57/027* (2012.01)
*F16H 57/029* (2012.01)
(Continued)

(52) U.S. Cl.
CPC ......... *F16H 57/027* (2013.01); *F16H 57/029* (2013.01); *H02K 5/10* (2013.01);
(Continued)

(58) Field of Classification Search
CPC ................. F16H 57/027; F16H 57/029; F16H 2057/02034; F16H 2057/02043; H02K 5/10; H02K 7/116; H02K 2205/09
See application file for complete search history.

(56) References Cited

U.S. PATENT DOCUMENTS 2,253,148 A * 8/1941 Tangen ................. F16H 57/027
74/15.84
2,315,317 A * 3/1943 Copp .................... F16H 57/027
474/146
(Continued)

FOREIGN PATENT DOCUMENTS

DE        19635180 A1     3/1998
DE    102007022192 A1    11/2008
(Continued)

OTHER PUBLICATIONS

Machine translation of DE 102017129586 A1, obtained from fit database (Year: 2019).*
(Continued)

*Primary Examiner* — Thomas C Diaz
(74) *Attorney, Agent, or Firm* — Suiter Swantz IP

(57) ABSTRACT

The present invention relates to a casing for a drive unit in which an electric motor and/or a transmission can be arranged. An exhaust ventilation interface is provided on/in the casing and has a permeable membrane, a shaft (2) accommodating the membrane. The invention also relates to a drive unit for a motor vehicle, comprising the casing according to the invention.

16 Claims, 1 Drawing Sheet

(51) Int. Cl.
   *H02K 5/10*       (2006.01)
   *H02K 7/116*      (2006.01)
   *F16H 57/02*       (2012.01)

(52) U.S. Cl.
   CPC .... *H02K 7/116* (2013.01); *F16H 2057/02034* (2013.01); *F16H 2057/02043* (2013.01); *H02K 2205/09* (2013.01)

(56)          References Cited

U.S. PATENT DOCUMENTS

| | | | | |
|---|---|---|---|---|
| 3,145,582 | A * | 8/1964 | Wagner | F16H 57/027 74/606 R |
| 3,866,789 | A * | 2/1975 | Lambert | F16H 57/027 220/373 |
| 5,522,769 | A * | 6/1996 | DeGuiseppi | H05K 5/0216 454/270 |
| 7,191,870 | B2 * | 3/2007 | Kimura | F16H 57/027 74/606 R |
| 9,789,759 | B1 * | 10/2017 | Rothrock | B60K 5/04 |

| | | | | |
|---|---|---|---|---|
| 2004/0173051 | A1 * | 9/2004 | Sinka | F16H 57/027 74/607 |
| 2020/0318727 | A1 * | 10/2020 | Ege | F16H 57/0461 |

FOREIGN PATENT DOCUMENTS

| | | | | |
|---|---|---|---|---|
| DE | 102015217112 | A1 | 3/2017 | |
| DE | 102017121056 | A1 | 3/2019 | |
| DE | 102017129586 | A1 * | 6/2019 | F16H 57/027 |
| DE | 202019103778 | U1 | 10/2020 | |
| DE | 102020110775 | A1 | 10/2021 | |
| DE | 102021203580 | A1 | 10/2021 | |
| EP | 0582804 | A1 * | 2/1994 | F16H 57/027 |
| JP | H10169760 | A * | 6/1998 | F16H 57/027 |

OTHER PUBLICATIONS

Machine translation of JPH10169760A, obtained from fit database (Year: 1998).*

European Patent Office, International Search Report and Written Opinion received in International Application No. PCT/DE2022/100795, Feb. 1, 2023, 20 pages (including translation).

* cited by examiner

CASING FOR A DRIVE UNIT, COMPRISING AN EXHAUST VENTILATION INTERFACE, AND DRIVE UNIT

CROSS-REFERENCE TO RELATED APPLICATION

The present application is the U.S. National Phase of PCT Patent Application Number PCT/DE2022/100795, filed on Oct. 26, 2022, which claims priority to German Patent Application Number 10 2021 131 216.7, filed Nov. 29, 2021, the entire disclosures of which are incorporated by reference herein.

TECHNICAL FIELD

The present disclosure relates to a casing for a motor vehicle drive unit, wherein an electric motor and/or a transmission can be arranged in the casing, the casing having a vent which has a permeable membrane.

BACKGROUND

Drive units, in particular electric drives for motor vehicles, which have at least one electric motor, have regions or components that must be sealed and protected (in defined manner) against external influences. For this purpose, a conventional casing of the drive unit is additionally provided with seals, which are conventionally mounted between the casing and the relevant structural components of the drive unit, whereby an enclosed interior space is sufficiently separated/divided from an exterior space. This prevents the entry of undesired media, for example water or (dirt) particles, as well as the exit of (working) media from the drive unit, for example oil, particles or other operating fluids.

Due to temperature changes during operation of the drive unit, the air or other gaseous media expand(s) or contract(s) within the interior spaces of the drive unit enclosed/sealed by the seals, which leads to pressure differences within the enclosed regions unless there is an opportunity for air/gas exchange. In order to enable this opportunity for air exchange and at the same time prevent the entry/exit of undesired materials into/out of the drive unit, the prior art uses permeable membranes as seals with a venting function. However, these permeable membranes are often vulnerable to abrasive media, for example oil, or to mechanical influences, for example from a high-pressure cleaner, which is why major effort conventionally has to be expended to protect these membranes.

SUMMARY

It is the object of the present disclosure to eliminate or at least mitigate the disadvantages of the prior art.

This object is achieved by a casing for a drive unit having a shaft that accommodates the membrane. This makes it possible to provide a casing for a (for example, electric) drive unit with a vent by means of which (oil) wetting of a permeable venting membrane/sealing membrane is prevented and/or at least reduced, such that the membrane is protected from the oil located in the drive unit, in particular in an E-axle of the drive unit.

The disclosure therefore relates to a casing for an (electric) motor vehicle drive unit, in which an electric motor/electromotor and/or a transmission can be or is/are arranged.

The casing further has a vent that includes a permeable membrane accommodated in a shaft of the casing.

In other words, the casing according to the disclosure for a drive unit has a shaft in the form of a gun barrel, which preferably has a circular, elliptical or polygonal cross section, in which a permeable (sealing) membrane with a venting function is arranged. Preferably, the shaft is configured/created as at least one through-opening/through-hole and runs in linear, bent or curved manner through the casing of the drive unit into the interior space of the drive unit. This means that the interior space of the drive unit is preferably connected to the environment/exterior space via this shaft. Preferably, the shaft of the casing is arranged in such a way that it does not collide with other components of the casing or the drive unit, for example plugs, headers or cables, and in addition, fitting of components, for example an inverter, is possible with no effort.

This arrangement of the permeable membrane within a (casing) shaft ensures the venting function described above as well as protection against the entry and exit of unwanted material/particles. At the same time, contact between the permeable membrane and the oil inside the drive machine is made more difficult, which ensures a cost-effective and space-optimized solution for protecting the membrane. In particular, the membrane, as a vent, is protected from the oil present in the E-axle of the drive machine.

Advantageous embodiments are the subject matter of the dependent claims and are explained in more detail below.

According to one advantageous embodiment for increasing protection against wetting, the membrane of the casing according to the disclosure is spaced from at least one end or from both ends of the shaft.

In other words, in a first embodiment, the permeable membrane is preferably arranged within the (casing) shaft in such a way that the membrane is mounted to one end of the shaft and is spaced from the other end of the shaft. Nevertheless, an arrangement of the membrane between the two ends of the shaft, i.e. in a central portion of the shaft, is conceivable. It is particularly advantageous to arrange the membrane at the end of the shaft that is furthest away from the interior space or the E-axle of the drive unit. This further reduces the likelihood of the membrane coming into contact with the oil of the drive motor.

In a further aspect of the disclosure, the shaft is formed by the casing material. In other words, the shaft in which the membrane is arranged is completely formed by the casing of the drive unit. This means that additional, cost-intensive individual components can be dispensed with, which also makes assembly easier.

In a further aspect of the disclosure, the membrane is secured in a region of enlarged diameter of the shaft. This facilitates assembly.

In other words, in a preferred embodiment of the casing, the shaft has a larger diameter at the point that circumferentially surrounds/encloses the membrane than the remaining portions of the shaft.

Preferably, the transition between the portions of the shaft of differing diameter is configured in the form of a step, against which the membrane rests or is adjacent when mounted/fitted. This fixes/defines the position of the membrane in the axial direction of the shaft.

According to one configuration of the disclosure that is advantageous for continuous operation, the membrane defines an interface in/on the casing, which is arranged at the uppermost point of the casing with respect to the gravity orientation when the drive unit is in operation.

In other words, the venting shaft is mounted/provided in the casing of the drive unit in such a way that the membrane is arranged at the highest possible point/position of the casing when the drive unit is in the operating state. This advantageously ensures that the opening of the shaft is always above the fill level or flow height of the oil, which largely prevents the possibility of contact of the oil with the membrane.

According to a further advantageous configuration of the disclosure, the shaft, viewed from the membrane, falls away along a horizontal axis in the direction of gravity.

In other words, the casing of the drive unit is configured such that the venting shaft is angled relative to a horizontal axis or arranged in an inclined position. Starting from the membrane, which is advantageously arranged at an (outer) end of the shaft, the shaft falls away along this horizontal axis relative to the direction of gravity. Due to this inclined position/orientation of the shaft, it is ensured that it is more difficult for the oil to flow out of the inside of the drive unit, i.e. from the lowest end of the shaft, into the shaft. The inclined position of the shaft prevents the oil from flowing along the shaft to its outer end. As a result, the risk of the membrane coming into contact with oil from the drive unit is further reduced.

According to a further advantageous configuration of the disclosure, the shaft has a diameter of at least 3 mm, in particular 4 mm or 5 mm with a tolerance of approximately ±10%. However, this diameter is no greater than 150 mm. This order of magnitude for the diameter of the shaft ensures an optimal venting function for the drive unit.

According to a further advantageous configuration of the disclosure, the shaft has a length-diameter ratio of greater than 5. Preferably the ratio of the length and the diameter of the shaft is 5.5, 6.0, 6.5, or 7.0, but always less than 150.

Particularly advantageously, if the length-diameter ratio is as far as possible precisely 5, it is ensured that the shaft is sufficiently long and the path/distance that the oil or another liquid has to travel to the membrane is large enough to prevent contact between the oil and the membrane.

In a further advantageous aspect of the disclosure, the end of the shaft remote from the membrane ends in a calming chamber of the drive unit, in which a fluid of the drive unit is calmed. In other words, the shaft opens into a portion/ region inside the drive unit in which the internal components have the lowest possible dynamics. In this calming chamber inside the drive unit, a fluid, in particular an oil, is largely calmed. Because the dynamics of the oil at the exit to the shaft are kept as low as possible, it is more difficult for this oil to exit via the shaft to the membrane at the outer end of the shaft. In particular, the calming chamber is arranged in the casing in such a way that it does not collide with other components and fitting of other components can be properly performed.

The disclosure further relates to a drive unit for a motor vehicle with the casing according to the disclosure, in which an electric motor and/or a transmission are arranged, as claimed, for example, in claim 10.

Both the disclosure and the technical field are explained in more detail below with reference to the figures. It should be noted that the disclosure is not intended to be limited by the exemplary embodiments shown. In particular, unless explicitly stated otherwise, it is also possible to extract sub-aspects of the subject matter explained in the figures and to combine them with other components and knowledge from the present description and/or figures. In particular, it should be noted that the figures and in particular the pro-portions shown are only schematic in nature. The same features are referenced with the same reference numbers. It is also pointed out that the features of the individual embodi-ments can be interchanged and can occur in a certain combination.

DESCRIPTION OF EMBODIMENTS

The present disclosure and one of the advantageous embodiments are described below with reference to the figures.

Figure 1:
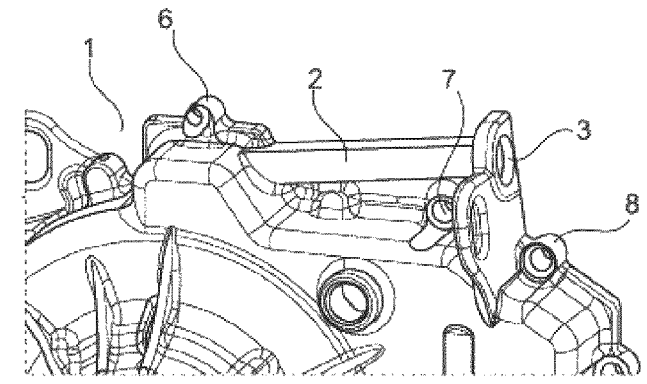
FIG. 1 is a side view onto the outside of a casing of a drive unit according to an advantageous embodiment.

FIG. 1 shows a side view of the outside of a casing 1 according to the disclosure according to an advantageous embodiment. The depicted casing 1 has a space in which an electric motor (not depicted) and/or a transmission can be arranged. In this view, an (E-)axle of the electric motor or transmission extends out of the image plane and the casing 1 has a projection or a bulge at the upper end, from which the shaft 2 extends in the form of a tube.

In this depiction, this shaft 2 runs almost horizontally along the image plane, perpendicular to the (E-)axle of the electric motor or gearbox, and is also formed in one piece with the casing 1, in particular the projection. The end of the shaft 2, which does not extend into the projection of the casing 1, opens into a flat, step-like portion which extends perpendicular to the shaft 2. This portion is formed in one piece with the casing 1 and has a region 3 of enlarged diameter as the exit of the shaft 2, the diameter of which is greater than that of the rest of the shaft 2. A permeable membrane (not depicted) with a simultaneous venting func-tion can be arranged or secured in this region 3 of enlarged diameter for sealing purposes. In addition, in this view, the outer end of the shaft 2 with the region 3 of enlarged diameter is arranged at the highest possible point of the casing with respect to the direction of gravity. Furthermore, in this side view of the casing 1, a plurality of through-holes 6, 7, 8 are shown, which extend out of the image plane and are intended for screwing the depicted casing part to a remaining casing part which is not depicted.

Figure 2:
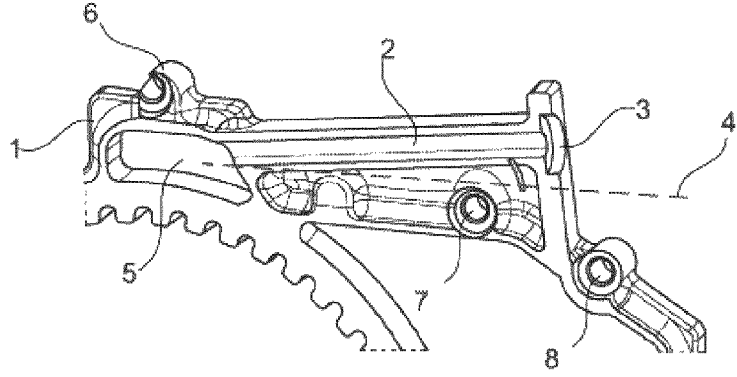
FIG. 2 is a longitudinally sectional perspective represen-tation of the casing of the embodiment of a drive unit shown in FIG. 1, the section plane extending in the region of a (venting) shaft.

FIG. 2 shows a longitudinally sectional perspective rep-resentation of the casing 1 according to the disclosure of the drive unit along the shaft 2 according to the advantageous embodiment of FIG. 1. The depicted axial section runs on the one hand through the shaft 2 and on the other hand through a calming chamber 5 of the casing 1. The calming chamber 5 is arranged inside the projection depicted in FIG. 1. One end of the shaft 2 adjoins the calming chamber 5 and, viewed with respect to the direction of gravity, runs obliquely upwards and ends in the region 3 of enlarged diameter, which forms the other end of the shaft 2. The oblique course of the shaft 2 is illustrated by a dashed line as the horizontal axis 4 in FIG. 2. Furthermore, the region 3 of enlarged diameter in which the permeable membrane can be arranged is arranged within the flat, step-like portion which is formed perpendicular to the shaft 2. Due to the enlarged diameter of the shaft 2 at the end remote from the calming chamber, i.e. the outer end, the region 3 of enlarged diameter borders the remaining part of the shaft 2 in stepped manner or resting against a step. The permeable membrane rests against this remaining part of the shaft 2 when mounted/fitted or when the drive unit is in operation. Furthermore, the through-holes 6, 7, 8 of FIG. 1 are depicted in this sectional view.

Figure 3:
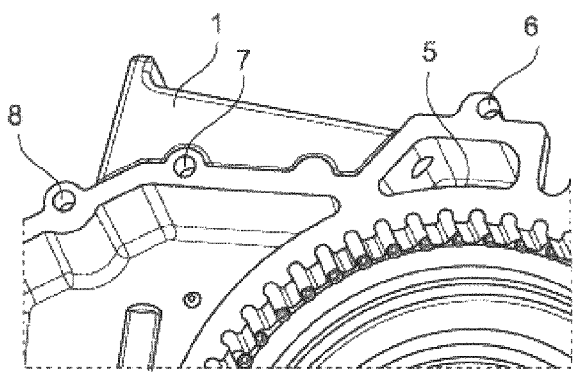
FIG. 3 is a longitudinally sectional perspective represen-tation of the casing of the drive unit of FIG. 2, the section plane being arranged in the region of a calming chamber.

FIG. 3 is a longitudinally sectional perspective representation of the casing 1 according to the disclosure of the drive unit of FIG. 2 along the calming chamber 5. This illustration shows the casing 1 of the drive unit from an inner side, which is opposite the outside of the casing 1 depicted in FIG. 1. The axial section of this view runs through the calming chamber 5 and past the shaft 2, which is not depicted in this view because it is concealed by a casing wall. The inner end or the exit opening to the shaft 2 is depicted in the calming chamber. In addition, the through-holes 6, 7, 8 for securing/screwing the depicted part of the casing 1 are depicted, which in this view run along a protruding portion of the casing 1. The shaft 2 is thus arranged in an outer region of the drive unit in relation to the (E-)axle of the electric motor or the transmission.

LIST OF REFERENCE SIGNS

1 Casing
2 Shaft
3 Region of enlarged diameter
4 Horizontal axis
5 Calming Chamber
6, 7, 8 Through-holes

The invention claimed is:

1. A casing for a drive unit of a motor vehicle, the casing comprising:
an interior space within which at least one of an electric motor or a transmission is configured to be arranged in the casing;
a projection disposed above the interior space, the projection defining a calming chamber inside the projection; and
a shaft extending from the projection, the shaft arranged in an inclined position running obliquely relative to horizontal, horizontal being defined perpendicular to gravity, the shaft comprising:
a first end adjoining the calming chamber, the first end being a lowest end of the shaft;
a second end opposed to the first end, the second end being a highest end of the shaft, the second end defining a stepped portion; and
a through-hole from the first end to the second end by which the shaft is configured to vent the calming chamber, the through-hole comprising a diameter smaller than the stepped portion, the stepped portion being concentric with the through-hole;
wherein the stepped portion accommodates a permeable membrane.

2. The casing as claimed in claim 1, wherein the through-hole of the shaft is linear.

3. The casing as claimed in claim 1, wherein the shaft is formed by a material of the casing.

4. The casing as claimed in claim 1, wherein the permeable membrane is configured to define an interface in the casing at the stepped portion.

5. The casing as claimed in claim 1, the casing comprising an internal ring gear, the internal ring gear defining the interior space.

6. The casing as claimed in claim 1, wherein the through-hole of the shaft has the diameter of at least 3 mm.

7. The casing as claimed in claim 1, wherein the shaft has a length-diameter ratio of greater than 5, the length-diameter ratio being a ratio of a length of the through-hole to the diameter of the through-hole.

8. The casing as claimed in claim 1, wherein a fluid of the drive unit is configured to be calmed in the calming chamber.

9. A drive unit for a motor vehicle comprising:
a casing comprising:
an interior space;
a projection disposed above the interior space, the projection defining a calming chamber inside the projection; and
a shaft extending from the projection, the shaft arranged in an inclined position running obliquely relative to horizontal, horizontal being defined perpendicular to gravity, the shaft comprising:
a first end adjoining the calming chamber, the first end being a lowest end of the shaft;
a second end opposed to the first end, the second end being a highest end of the shaft, the second end defining a stepped portion; and
a through-hole from the first end to the second end by which the shaft is configured to vent the calming chamber, the through-hole comprising a diameter smaller than the stepped portion, the stepped portion being concentric with the through-hole;
wherein the stepped portion accommodates a permeable membrane;
an electric motor; and
a transmission, at least one of the electric motor or the transmission being arranged in the interior space of the casing.

10. The drive unit according to claim 9, wherein the through-hole of the shaft is linear.

11. The drive unit according to claim 9, wherein the shaft and casing are formed from a same material.

12. The drive unit according to claim 9, wherein the permeable membrane is configured to define an interface in the casing at the stepped portion.

13. The drive unit according to claim 9, wherein the shaft has a length-diameter ratio of greater than 5, the length-diameter ratio being a ratio of a length of the through-hole to the diameter of the through-hole.

14. The drive unit according to claim 9, wherein a fluid of the drive unit is configured to be calmed in the calming chamber.

15. The drive unit according to claim 9, wherein the through-hole has a cross-sectional shape comprising at least one of a circular shape, an elliptical shape, or a polygonal shape.

16. An electric motor vehicle comprising:
a drive unit comprising:
a casing comprising:
an interior space;
a projection disposed above the interior space, the projection defining a calming chamber inside the projection; and
a shaft extending from the projection, the shaft arranged in an inclined position running obliquely relative to horizontal, horizontal being defined perpendicular to gravity, the shaft comprising:
a first end adjoining the calming chamber, the first end being a lowest end of the shaft;

a second end opposed to the first end, the second end being a highest end of the shaft, the second end defining a stepped portion; and a through-hole from the first end to the second end by which the shaft is configured to vent the calming chamber, the through-hole comprising a diameter smaller than the stepped portion, the stepped portion being concentric with the through-hole;

wherein the stepped portion accommodates a permeable membrane;

an electric motor; and a transmission, at least one of the electric motor or the transmission being arranged in the interior space of the casing.

\* \* \* \* \*